United States Patent

[11] 3,615,600

[72] Inventor Christiaan Herman Theodoor Tonsbeek
        Zevenaar, Netherlands
[21] Appl. No. 698,718
[22] Filed Jan. 18, 1968
[45] Patented Oct. 26, 1971
[73] Assignee Lever Brothers Company
        New York, N.Y.
[32] Priority Jan. 20, 1967
[33]         Netherlands
[31]         6700991

[54] MEAT FLAVOR COMPOSITION CONTAINING SUCCINIC ACID
    11 Claims, No Drawings
[52] U.S. Cl. .................................................. 99/140 N
[51] Int. Cl. .................................................. A23l 1/22
[50] Field of Search ............................................ 99/140, 140 N

[56]            References Cited
            UNITED STATES PATENTS
3,326,697   6/1967   Shimazono et al............   99/140
            FOREIGN PATENTS
6,604,570  10/1966   Netherlands..................   99/140

Primary Examiner—Morris O. Wolk
Assistant Examiner—Warren Bovee
Attorney—Louis F. Kline, Jr.

ABSTRACT: Artificial flavoring mixtures which can impart a meaty flavor to foods. The mixtures contain an amino acid including glutamic acid, a nucleotide and critical amounts of succinic acid and a hydroxycarboxylic acid including lactic acid.

MEAT FLAVOR COMPOSITION CONTAINING SUCCINIC ACID

New and valuable artificial flavoring mixtures, including concentrated as well as ready-for-use foodstuffs, and processes for the preparation of such mixtures.

The taste of meat of many commercially available foodstuffs, such as soups, gravy, and the like, is obtained by incorporating, during their preparation, a product commercially known as meat extract, indicated below as commercial meat extract. This commercial meat extract is generally obtained by extraction with water of the meat of slaughtered cattle, especially horned cattle, followed by evaporation of the greater part of the water. The commercial meat extract thus obtained is a brown product generally containing 14-25 percent of moisture. This commercial meat extract is expensive, its preparation is time consuming and requires much energy, and the yield is only a few percent by weight of the expensive starting material (meat).

This commercial meat extract is not only expensive and of variable quality but after dilution with water, it has a taste different from that of a broth or gravy prepared direct from meat. This difference is probably caused by certain reactions between various substances taking place during the prolonged heating when preparing the commercial meat extract, such as between amino acids and sugars, which during the preparation of the fresh extract proceed less far or not at all. Thus undesirable "shades of" taste and the dark color may develop in the commercial meat extract and the foodstuffs prepared with it.

An object of the invention is to provide new, improved, artificially prepared flavoring mixtures that do not possess the undesired shades of taste and that are of light color, and provides concentrated as well as ready-for-use foodstuffs and a process for the preparation thereof.

Using the product of this invention commercial meat extract may be partly or entirely replaced by a meatless composition, so that, beside giving an improved taste and a lighter color, a considerable cost saving can be realized. A partial replacement of commercial meat extract by an artificial flavoring mixture according to the invention may already lead to a shifting into the background of an undesirable shade of taste of the commercial meat extract in the final foodstuff. An additional advantage is that—in contrast with the commercial meat extract—the compositions obtained according to the invention may have a constant quality and a constant price.

Various publications have been issued on the composition of commercial meat extract, e.g. by T. Wood and A. E. Bender in "The Biochemical Journal" 67, 366–373 (1957), entitled "Analysis of tissue constituents (commercial ox-muscle extract)." In a later publication of A. E. Bender, T. Wood and J. A. Palgrave in "Journal of the Science of Food and Agriculture" Dec. 9, 1958, 812–817, entitled "Analysis of tissue constituents, Extract of fresh ox-muscle," the composition of commercial meat extract was compared with an extract of fresh beef obtained by treating beef with ice water.

Various groups of compounds were qualitatively indicated and quantitatively determined, among which:
Amino acids and peptides
Organic phosphates (inter alia phosphate containing amino acids) and inorganic phosphate
Guanidines (especially creatine–creatinine)
Purines (free and combined in nucleotides)
Organic acids (lactic acid, glycolic acid, succinic acid, β-hydroxybutryic acid)
as well as reducing sugars and products such as carnitine, urea, ammonia and inorganic material not further specified.

In a later publication of T. Wood in "Journal of Science Food and Agriculture," Jan. 12, 1961, pp 61–69, entitled "The browning of ox-muscle extracts," especially on page 65, artificial extracts are described, which were composed based on the results mentioned in the above publications.

Of these artificial extracts, in which a peptide and the phosphorus-containing amino acids were lacking, but to which a small amount of the nucleotide inosinic acid (inosine-5'-monophosphate) had been added, the authors state that this produce had only a faint taste of meat due to the presence of this nucleotide.

In Dutch Pat. No. 6,604,570 in the name of Ajinomoto Co., Inc. Tokyo, artificial flavoring mixtures are described which serve as a substitute for meat extract.

These mixtures include amino acids, phosphates, 5'-nucleotides and organic acids (especially lactic acid and succinic acid). As to the amounts of succinic acid and lactic acid this specification states that the total amount of organic acid is less than 3 parts by weight, preferably between 0.1 and 2 parts by weight calculated on the amino acids excluding the glutamic acid, and that the amount of succinic acid should not be too high (although no upper limit is given) because if the amount of succinic acid is too high a taste of crustacea (shellfish) is obtained. In this connection the publications of Wood and Bender mention for commercial meat extract 1.43 percent succinic acid and 16.40 percent lactic acid, i.e. a mutual weight ratio of 1:11.7, and for a product obtained by extraction of meat with ice water 0.88 percent succinic acid and 23.04 percent lactic acid, i.e. a mutual weight ratio of 1:26. The artificial product obtained by these research workers on the basis of the latter composition tasted faintly like meat and therefor provide no good substitute for commercial meat extract or meat broth.

The above-mentioned Dutch specification shows in the examples (i.e. II to VIII) weight ratios of succinic acid to lactic acid of about 1:6 so that upon comparison with the products with a meaty taste described by T. Wood c.s. the former products show a considerably higher quantity of succinic acid.

Surprisingly it has now been found that a "fuller" taste of meat may be obtained if the weight ratio of succinic acid to lactic acid is considerably lower than that which is described in the above Dutch application. This better taste is obtained if the weight ratio succinic acid:lactic acid is between 1:30 and 1:150 and preferably between 1:40 and 1:80. This is unexpected if one bears in mind that the patent application of Ajinomoto points in the direction of applying more succinic acid relative to lactic acid, whereas it now appeared that by the very application of considerably lower amounts of succinic acid with regard to lactic acid better results may be obtained.

Accordingly the present invention provides an artificial flavoring mixture comprising amino acids, including glutamic acid, a nucleotide, succinic acid and a hydroxycarboxylic acid, which has two to five carbon atoms in the molecule and consists of at least 50 mol percent, based on the hydroxy carboxylic acid, of lactic acid, in which the weight ratio of succinic acid to hydroxycarboxylic acid, calculated as the equimolar amount of lactic acid, is between 1:30 and 1:150.

It has also been found that phosphates (other than the nucleotides) like inorganic and organic phosphates—in contrast with what has been stated in the above-mentioned Dutch specification—do not constitute essential ingredients of flavoring mixtures with a meaty taste. The presence of these other phosphates is therefore according to the present invention superfluous. However since the use of phosphates in the foodstuffs industry is wide spread, the invention also includes the use of the new flavoring mixtures in the presence of phosphate.

As the present invention is concerned with flavoring mixtures, including concentrated and ready-for-use foodstuffs, it is impossible to indicate absolute concentration areas. For a ready-for-use broth or soup it is in general desirable to work in such concentrations, observing the above ratio, that the quantity of succinic acid amounts to between 5 and 100 milligrams per liter.

For the present invention improved artificial flavoring mixtures are obtained with mixtures in which are present:
Amino acids, including glutamic acid (or its salts)
Nucleotides
Succinic acid Lactic acid and any other lower hydroxycarboxylic acid in a weight ratio succinic acid:hydroxycarboxylic acid of between 1:30 and 1:150; preferably this weight ratio lies between 1:40 and 1:80.

In order to determine this weight ratio lactate, succinate and any other salts are calculated in the form of the free acid. Any hydroxycarboxylic acid present other than lactic acid is calculated in the form of the equimolar amounts of lactic acid. The weight ratio in question is critical for obtaining a good taste and therefore important.

Since products from natural starting materials such as commercial meat extract often vary in composition in view of their changeable starting material, and since it is possible that some naturally occurring products fulfill the qualitative and quantitative limits of this invention, it is to be understood that the invention therefore does not include natural products such as extracts of meat, nor the incorporation thereof in foodstuffs, but is related to artificially composed flavoring mixtures.

Amino acids can be defined here as the building units of proteins. As to the selection of the amino acids and their mutual ratios, it is preferable to simulate the amino acid composition of beef broth.

The amino acids required for carrying out the invention may be obtained by hydrolysis autolysis or fermentation, or combinations of these processes applied to vegetable or animal proteins, such as soybean protein, gluten, casein and yeast, or extracts of these. Although they differ from the composition according to the invention, the mixtures thus obtained form an excellent starting material for such compositions. By the addition of at least some of the components: nucelotides, succinic acid and lactic acid and any other lower hydroxycarboxylic acid, the artificial flavoring substance according to the invention can be obtained. To obtain the best results it is desirable that the amino acid mixture has a good taste and is purified, if necessary. In addition the inclusion of an extra quantity of certain amino acids, such as glutamic acid, methionine, alanine, tryptophane, cysteine, and the like may be desirable. It is necessary that glutamic acid and its salts are present in sufficient amounts to give the desired contribution to the taste in the final ready-for-use foodstuff, for example in a broth or soup in a concentration of 0.05–7 grams per liter. As to the amount of amino acids, especially the amount of hydrolysate, it is necessary that this is present in the ready-for-use foodstuff in an amount sufficient to give the desired contribution to the taste, for example, in a broth or soup in a concentration of 0.1–7 grams per liter.

It is usual for manufacturers of foodstuffs to add to their products various materials including compositions with a taste of meat, amino acids such as hydrolysates, autolysates, and glutamate in variable amounts. It is therefore not possible to define exactly the relative amounts of these components in the artificial flavoring mixtures according to the invention since some components may be present in the foodstuff. Thus the amount by weight of amino acid, including glutamic acid to lactic acid (calculated on hydroxycarboxylic acid) is preferably between 1:0.05 and 1:20.

The nucleotides employed according to the invention are flavor boosters, particularly the 5'-ribonucleotides. As such are known for example adenosine-5'monophosphate (5'—AMP), quanosine-5'-monophosphate (5'GMP), inosine-5'-monophosphate (5'—IMP), xanthosine-5'-monophosphate (5'XMP) uridine-5'-monophosphate (5'—UMP), cytidine-5'-monophosphate (5'—CMP), their amides, desoxy derivatives, salts, and the like.

According to the present invention one special nucleotide may be applied, but it may be advantageous to use a combination of nucleotides. Owing to their differing flavoring properties the amount of nucleotide that is employed depends, among other things, on the nature of the nucleotide used; when 5'—GMP is used, the amount is 0.05–5 parts by weight per part of succinic acid and for 5'—IMP 0.1–20 parts by weight per part of succinic acid. With commercially available mixtures containing 5'—GMP and 5'-IMP in about equal parts, addition of 0.1–10 parts by weight per part of succinic acid is sufficient.

According to the invention succinic acid and lactic acid are employed together, lactic acid being preferred to other lower hydroxycarboxylic acids. However, the acid may partly, i.e. to 50 mol percent be replaced by other lower hydroxycarboxylic acids containing two to five carbon atoms, such as glycolic acid, β-hydroxybutryic acid and malic acid.

A satisfying meaty taste was obtained with a mixture of amino acids including glutamic acid, nucelotides, as well as succinic acid and lactic acid in a weight ratio between 1:30 and 1:150, preferably between 1:40 and 1:80. In a soup such a mixture was appreciated as "good" by a tasting panel. The appreciation was clearly less if one of the components was left out or did not fulfill the indicated weight ratio of succinic acid to lactic acid. Too high a dosage of the succinic acid appeared to cause a diminished appreciation of the product.

The two carboxylic acid components will not exclusively occur in the free acid form in the composition according to the invention, but partially in the form of their salts, since the acidity of the ready-for-use product is adjusted such that the pH is from 4 to 8, preferably from 4.8 to 6.8. These salts of succinic acid and lactic acid as well as those of any other lower hydroxy acids are reduced to the corresponding equimolar amounts of succinic acid and lactic acid for the purpose of calculating quantities.

In order to obtain a composition with a fuller meaty taste, other substances may be utilized. Thus the amino acids, nucleotides, succinic acid and lactic acid in the proportions according to the invention may be employed together with at least one compound of at least one of the following classes of substances:

1. Amino acids such as homocysteic acid, ornithine, oxyproline, β-hydroxy glutamic acid
2. Peptides such as alanyl-alanine, alanyl-phenylalanine, alanyl-asparagine, carnosine, anserine.
3. Sweetening substances, both artificial sweetening substances, such as saccharine or cyclamates, and sugars, particularly mono- and disaccharides.
4. Substances with the flavor of meat or broth, particularly sulfur-containing compounds, such as reaction products of amino acids like cysteine/cystine with reducing sugars, ascorbic acid and the like, reaction products of hydrogen sulfide with lower aliphatic aldehydes and ketones (e.g. propion aldehyde, croton aldehyde, methional, mercaptoacetaldehyde).
5. Other volatile sulfur compounds, such as $H_2S$, mercaptans, disulfides and sulfides, such as dimethyl sulfide and diallyl sulfide.
6. Guanidines, such as creatine and creatinine.
7. Salts, such as NaCl and phosphates and particularly in connection with pH control, acid phosphates like $Na_2HPO_4$, $NaH_2PO_4$ or other alkali or ammonium phosphates and organic phosphates, such as phosphorus containing amino acids. However, it is by no means essential to incorporate phosphates.
8. Nitrogen compounds, such as ammonia, amines, urea, indole and skatole.
9. Unsaturated or saturated carboxylic acids with e.g. two to 12 therefrom, carbon atoms.
10. Unsaturated or saturated higher hydroxycarboxylic acids and γ and δ-lactones derived therefrom, such as deca- and dodeca-5-olides 2,3 dimethyl-2,4-alkadiene-4-olides.
11. Lower saturated and unsaturated aldehydes, such as acetaldehyde, propion aldehyde, iso-butyraldehyde and hepten-4al.
12. Lower saturated and unsaturated ketones, such as acetone, butanone and diacetyl.
13. Tricholominic acid and ibotenic acid or their salts.
14. Aromatic or nonaromatic carbocyclic and/or heterocyclic compounds, such as ortho amino-acetophenone, N-acetonyl pyrrole, maltol isomaltol, ethyl maltol, lenthionine, hypoxanthine, guanine, inosine and guanosine,
15. Lower saturated and unsaturated alcohols, such as ethanol, glycerol, octanol.

16. Coloring substances, such as e.g. curcuma, caramel.
17. Thickening agents such as gelatin and starch.

The dosage of these optional ingredients is dependent on the kind of flavor one wishes to imitate, on the nature of the foodstuff to which it is added and or the other ingredients added, such as herbs and spices.

By flavoring mixtures according to the invention are to be understood products such as: substitutes for commercial meat extract, as one employed in the foodstuffs industry, "powdered flavor" such as that which may be sprinkled over foodstuffs shortly before consumption, gravy cubes, dried and concentrated soup and in general all ready-for-use foodstuffs and concentrated foodstuffs which usually possess a meat or broth flavor or in which such a shade of flavor is appreciated. Thus a more pronounced meat flavor can be imparted especially to soup, concentrated soup (e.g. tinned or dry soup), preserved meals, gravy, rissoles, preserved meat, e.g. tinned ham, with the flavoring mixture according to the invention.

The flavoring mixture according to this invention may also be used to impart a meaty flavor to potato chip and puff-type products and to mayonnaise based products.

The flavoring mixture according to the invention may be prepared simply in the form of a paste. Likewise it is possible to prepare a granulated or powder product by using for example fillers such as kitchen salt, starch and gelatin.

Further it is possible to coat the powdery or granulated product with a substance such as a fat or saccharide.

The following examples are given to illustrate the invention.

EXAMPLE 1

A flavoring mixture was prepared by dissolving the following ingredients in water:
 1.0 g. casein hydrolysate
 1.0 g. monosodium glutamate
 0.6 g. inosine-5'-monophosphate
 0.15 g. succinic acid
 10.0 g. lactic acid The pH of this solution was adjusted to 6.0 and subsequently the solution was diluted to 1 liter. This solution is referred to as solution A.

A soup base was prepared by mixing the following ingredients and diluting them with water to 1 liter:
 6.0 g. kitchen salt
 1.0 g. monosodium glutamate
 0.5 g. Gistex (ex Kon. Ned. Gist- en Spiritusfabriek N.V., Delft) (Gistex is a Dutch abbreviation of "yeast extract")
 2.0 g. lard
 0.5 g. onion powder
 0.02 g. curcuma
 0.05 g. parsley
 2.0 g. casein hydrolysate
 0.07 g. mixed herbs for soup To 1 liter of this soup base 100 ml. of solution A was added. Another sample was prepared by adding to 1 liter of soup base 2 g. of meat extract dissolved in 100 ml. of water. After cooking for 10 minutes the two samples were tasted by a panel of 25 persons in a triangle-test. In this test 19 persons recognized the deviating sample, whereas 15 persons out of these 19 preferred the sample containing flavoring mixture A. This indicates a significant preference for the product prepared with the artificial flavoring mixture.

EXAMPLE 2

A flavoring mixture was prepared by dissolving the following ingredients in water:
 1.0 g. protein hydrolysate (casein)
 1.0 g. monosodium glutamate
 0.6 g. inosine-5'-monophosphate
 0.15 g. succinic acid
 3.0 g. lactic acid The pH of this solution was adjusted at 6.0 and subsequently diluted to 1 liter. This solution is referred to as solution B.

To 1 liter of the soup base described in example 1 100 ml. of solution A was added. Another sample was prepared by adding to 1 liter of this base 100 ml. of solution B. After cooking for 10 minutes, the two samples were judged by a panel of 36 persons. Twenty-six persons preferred the soup with the higher content of lactic acid.

This shows that a flavoring mixture in which the weight ratio succinic acid:lactic acid is 1:66 is preferred to a flavoring mixture in which this ratio is 1:20.

EXAMPLE 3

Two flavoring mixtures were prepared by dissolving the following ingredients in water:

|  | Solution C | Solution D |
| --- | --- | --- |
| Casein hydrolysate | 2.00 g. | 2.00 g. |
| Monosodium glutamate | 2.00 g. | 2.00 g. |
| Inosine-5'-monophosphate | 0.05 g. | 0.05 g. |
| Succinic acid | 0.10 g. | 0.10 g. |
| Lactic acid | 0.60 g. | 3.50 g. |

The pH of these solutions was adjusted at 5.2 and subsequently the two solutions were diluted to 1 liter. Then two samples were prepared by diluting 100 ml. of the two solutions described above to 1 liter and cooking for 10 minutes. In an organoleptic examination by a panel of 29 persons, 23 persons preferred the solution in which the weight ratio succinic acid:lactic acid is 1:35.

EXAMPLE 4

The flavoring mixtures were prepared by dissolving the following ingredients in water:

|  | Solution D | Solution E |
| --- | --- | --- |
| Casein hydrolysate | 2.00 g. | 2.00 g. |
| Monosodium glutamate | 2.00 g. | 2.00 g. |
| Inosine-5'-monophosphate | 0.05 g. | 0.05 g. |
| Succinic acid | 0.10 g. | 0.10 g. |
| Lactic acid | 3.50 g. | 6.00 g. |

The pH of these solutions was adjusted at 5.5 and subsequently the two solutions were diluted to 1 liter. Then two samples were prepared by diluting 100 ml. of the two solutions described above to 1 liter and cooking for 10 minutes. The two samples were tasted in a triangle-test by a panel of 47 persons. Twenty-five persons indicated the deviating sample correctly and of these 25 persons 18 preferred the solution with the higher content of lactic acid. The mixture in which the weight ratio succinic acid:lactic acid=1:60 was preferred to the mixture in which this weight ratio is 1:35.

EXAMPLE 5

A flavoring mixture was prepared by dissolving the following ingredients in water:
 1.0 g. casein hydrolysate
 1.0 g. monosodium glutamate
 0.6 g. inosine-5'-monophosphate
 0.15 g. succinic acid
 10.0 g. lactic acid
 2.5 g. phosphoric acid The pH of the solution was adjusted at 6.0 and subsequently the solution was diluted to 1 liter. This solution is referred to as Solution F.

To 1 liter soup base from example 100 ml. of solution A was added. Another sample was prepared by adding to 1 liter of this base 100 ml. of solution F.

After 10 minutes cooking, the two samples were judged in a triangle-test by a group of 36 persons. Thirteen persons recognized the deviating sample. So it appears that the panel did not taste a difference between soups to which phosphate had or had not been added.

EXAMPLE 6

A flavoring mixture was prepared by dissolving the following ingredients in water:
- 10.0 g. casein hydrolysate
- 5.0 g. monosodium glutamate
- 0.6 g. inosine-5'-monophosphate
- 0.6 g. guanosine-5'-monophosphate
- 0.2 g. succinic acid
- 14.0 g. lactic acid
- 0.1 g. malic acid
- 0.5 g. fumaric acid
- 1.0 g. taurine
- 2.0 g. carnosine
- 0.1 g. guanosine
- 1.0 g. fructose
- 10.0 g. kitchen salt The pH of this solution was adjusted at 5.2 and subsequently the solution was diluted to 1 liter. This solution is referred to as Solution G.

A gravy base was prepared by mixing the following ingredients and diluting them with water to 1 liter:
- 3.00 g. gelatin
- 5.00 g. potato starch
- 2.50 g. onion powder
- 3.00 g. monosodium glutamate
- 5.00 g. lard
- 0.80 g. caramel
- 0.02 g. pepper
- 0.02 g. laurel
- 0.02 g. cloves
- 3.00 g. kitchen salt To 1 liter of the above-mentioned gravy mixture were added 100 ml. of solution G. Another sample was prepared by adding to the gravy base 2.5 g. of meat extract in 100 ml. of water. Both samples were cooked for 10 minutes and subsequently judged by a panel of 23 persons. Nineteen persons of the panel preferred the sample containing solution G.

EXAMPLE 7

Thirty g. of butter were melted and then mixed with 30 g. of flour. To this were added while stirring and heating 200 g. of broth made from 80 g. of meat; the sauce obtained was finished with 0.01 g. of pepper, 2 g. of kitchen salt and 0.5 g. of monosodium glutamate. 100 g. of finely divided veal, well-done in an ample amount of water, were mixed therewith. After shaping and dusting the rissoles so produced were fried in frying fat.

In the same way rissoles were made in which, instead of 200 ml. of broth, 200 ml. of a 10 times diluted solution G (see example 6) were added.

A panel of 25 persons did not detect a significant difference between the two formulations.

EXAMPLE 8

Spun soybean protein fibers were thoroughly washed and subsequently roughly cut. The pieces thus obtained were ground with an excess of water in a household mixer and then sieved out. The mixture was then cooked in water for 15 minutes, and after cooling separated using a sieve from the superfluous water. Further water was removed by pressing the sieved-out product in a cloth. To 100 g. of this product was subsequently added 1 g. kitchen salt, 20 g. of pasteurized egg white and some caramel. After mixing thoroughly the mixture was pressed into an artificial sausage casing and coagulated in a boiling water bath for 30 minutes.

In exactly the same way imitation meat was made to which besides 1 g. of kitchen salt, 20 g. white of a chicken egg and caramel, a dry mixture was added of:
- 0.040 g. casein hydrolysate
- 0.010 g. inosine-5'-monophosphate
- 0.005 g. succinic acid
- 0.300 g. sodium lactate All tasters were unanimously of the opinion that the latter product had a good taste of cooked meat, whereas the former product only had a salty taste.

EXAMPLE 9

Two flavoring mixtures were prepared by dissolving the following ingredients in water:

|   | Solution H | Solution J |
|---|---|---|
| Casein hydrolysate, nonsaline | 1.10 | 1.0 |
| Monosodium glutamate | 0.19 | |
| Inosine-5'-monophosphate | 0.10 | 0.45 |
| Succinic acid | 0.18 | 0.18 |
| Lactic acid | 1.20 | 12.5 |
| Kitchen salt | 0.30 | 1.0 |
| Phosphoric acid | 0.20 | |
| Sodium tartrate | 0.10 | |
| Ammonium chloride | 0.16 | |
| Glucose | 0.50 | |
| Lactose | 0.16 | |
| Maize starch | 0.05 | |
| Creatine | 0.31 | 0.30 |

The pH of these two solutions was adjusted at 5.5 and subsequently the two solutions were diluted to 1 liter.

2 liters of soup base were prepared by mixing the following ingredients and diluting them with water to 2 liters:
- 3.92 g. lard
- 0.28 g. garlic powder
- 0.34 g. carrot powder
- 0.22 g. caramel dye
- 4.92 g. sugar
- 14.6 g. salt
- 0.112 g. onion powder
- 3.92 g. monosodium glutamate
- 11.2 g. casein hydrolysate
- 1.34 g. meat extract To this soup base were added per liter 100 ml. solution H and 100 ml. solution J, respectively. After cooking for 10 minutes the two soups were judged organoleptically by a taste panel of 29 persons. Twenty-six persons preferred the soup prepared with solution J.

EXAMPLE 10

A dried pulverized flavoring mixture was prepared in the following way: 825 g. sodium lactate solution (60 percent by weight pH = 6.0) were mixed with 1,200 g. potato starch. After setting a loose mass resulted, which was dried and subsequently ground. To 1,100 g. of the powder obtained in this way the following ground ingredients were added:
- 6.0 g. succinic acid
- 15.0 g. inosine-5'-monophosphate
- 3.0 g. guanosine-5'-monophosphate
- 100 g. casein hydrolysate
- 100 g. kitchen salt
- 10.0 g. taurine
- 10.0 g. glucose
- 2.0 g. malic acid By thoroughly mixing these components a pulverized flavoring mixture was obtained. Subsequently two samples were prepared, one by dissolving 5 g. of commercial meat extract in 1 liter of water and another by dissolving 7 g. of the flavoring mixture described above in 1 liter of water. After cooking for 10 minutes the two samples were judged organoleptically.

The taste of the solution containing the artificial flavoring mixture was almost unanimously preferred.

EXAMPLE 11

A dry soup was prepared by mixing the following ingredients:
- 70.0 g. pulverized artificial flavoring mixture (see example 10)

10.0 g. monosodium glutamate
20.0 g. casein hydrolysate
30.0 g. dried onions
40.0 g. dried meat
10.0 g. milk powder
50.0 g. fat
4.0 g. paprika
2.0 g. dried green leek
0.2 g. pepper
0.2 g. thyme
0.1 g. laurel
0.1 g. mace
60.0 g. salt A ready-for-use soup was prepared by adding 65 g. of this dry powder to 2 liters of hot water. After cooking for 10 minutes this soup was organoleptically judged and qualified as a very good beef soup.

EXAMPLE 12

A soup base of a volume of 2 liters was prepared from the following ingredients:
200 g. leeks
120 g. noodles
100 g. carrots
70 g. onions
32 g. kitchen salt
25 g. fat
10 g. celery leaves
10 g. parsley
5 g. monosodium glutamate
2 g. hydrolyzed soy protein
0.2 g. pepper A flavoring mixture was prepared by dissolving the following ingredients in water:
16.0 g. lactic acid
10.0 g. kitchen salt
0.3 g. succinic acid
0.7 g. inosine-5'-monophosphate
0.1 g. 5'-guanosine-5'-monophosphate
2.0 g. creatine
0.2 malic acid The pH of this solution was adjusted to 5.8 and the volume of the solution was made up to 1 liter.

A concentrated soup was prepared by mixing 400 ml. of the soup base with 100 ml. of the flavoring composition. The resulting product was sterilized in 0.5 liter cans for 1 hour at 120° C. A reference sample was prepared by mixing 400 ml. of the soup base with 100 ml. of water containing 1.5 g. of meat extract of first quality. This reference sample was sterilized in the same way as the sample with the flavoring composition.

A product ready for consumption was prepared by mixing the contents of four cans with 2 liters of water and by heating the resulting mixture to the boil.

Both samples were tasted by a panel consisting of 35 persons. Twenty-seven members of the panel preferred the sample containing the artificial flavoring composition.

What is claimed is:

1. An artificial flavoring mixture comprising at least one amino acid including glutamic acid, a nucleotide, succinic acid and a hydroxy carboxylic acid said hydroxycarboxylic acid having from 2 to 5 carbon atoms in the molecule and consisting of at least 50 mol percent, calculated on the hydroxycarboxylic acid, of lactic acid, in which mixture the weight ratio of succinic acid to hydroxycarboxylic acid (calculated as the equimolar amount of lactic acid) is between 1:30 and 1:150.

2. An artificial flavoring mixture as claimed in claim 1 in which the weight ratio of succinic acid to the hydroxycarboxylic acid is between 1:40 and 1:80.

3. An artificial flavoring mixture as claimed in claim 1 in which the hydroxycarboxylic acid consists of lactic acid.

4. An artificial flavoring mixture as claimed in claim 1 in which the nucleotide comprises a 5'-ribonucleotide.

5. An artificial flavoring mixture as claimed in claim 4 in which the 5'-ribonucleotide is guanosine-5'-monophosphate.

6. An artificial flavoring mixture as claimed in claim 4 in which the 5'-ribonucleotide is inosine-5'-monophosphate.

7. An artificial flavoring mixture as claimed in claim 1 in which the weight ration of succinic acid to nucleotide is between 1:0.05 and 1:20.

8. An artificial flavoring mixture as claimed in claim 1 in which the weight ratio of amino acid, including glutamic acid, to hydroxycarboxylic acid is between 1:0.05 and 1:20.

9. An artificial flavoring mixture as claimed in claim 1 in which the amino acids are obtained by a process selected from hydrolysis, autolysis and fermentation of materials selected from vegetable and animal proteins and extracts thereof and in which at least one additional amino acid selected from methionine, alanine, tryptophane and cysteine has been added.

10. A foodstuff comprising an artificial flavoring mixture as claimed in claim 1.

11. A process for the production of an artificial flavoring mixture as claimed in claim 1 comprising mixing at least one amino acid including glutamic acid, a nucleotide, succinic acid and a hydroxy carboxylic acid said hydroxycarboxylic acid having from 2 to 5 carbon atoms in the molecule and consisting of at least 50 mol percent, calculated on the hydroxycarboxylic acid, of lactic acid, in which mixture the weight ratio of succinic acid to hydroxycarboxylic acid (calculated as the equimolar amount of lactic acid) is between 1:30 and 1:150.